Oct. 8, 1968 H. D. KASPER 3,404,518
GANG MOWER
Filed Oct. 23, 1965 2 Sheets-Sheet 1
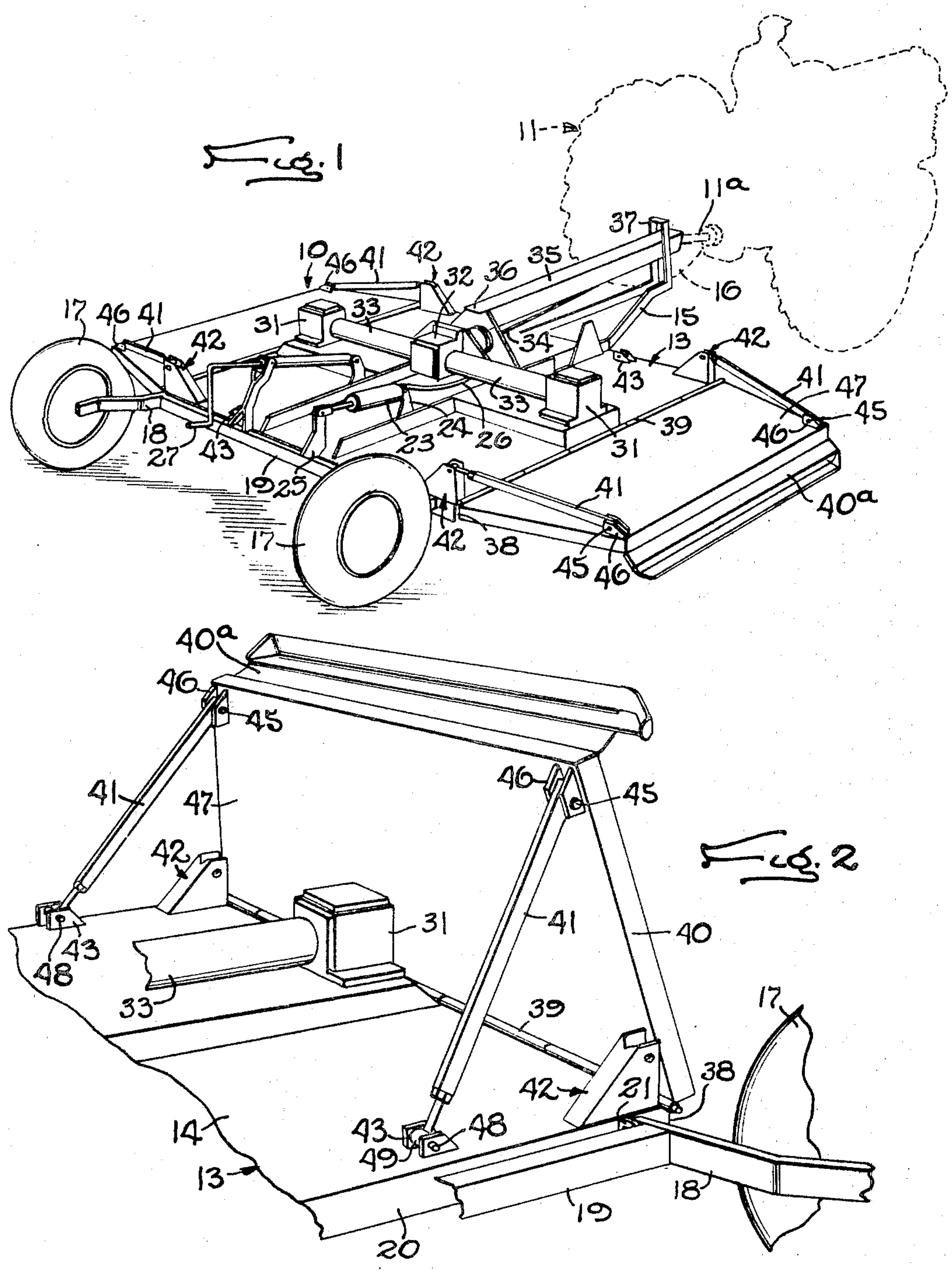
INVENTOR
Henry D. Kasper
by Wolfe, Hubbard, Voit & Osann
ATTORNEYS

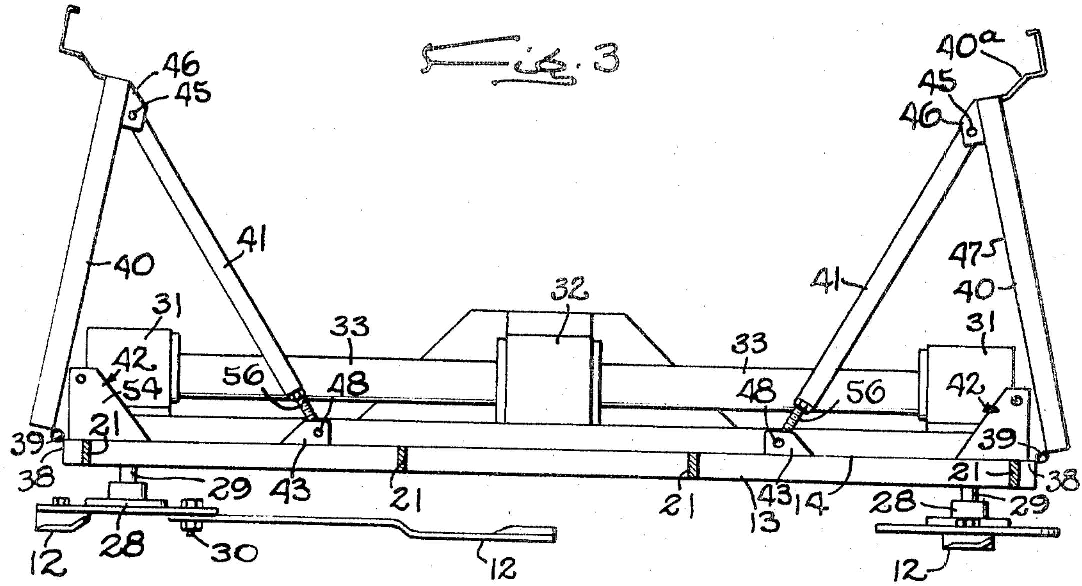
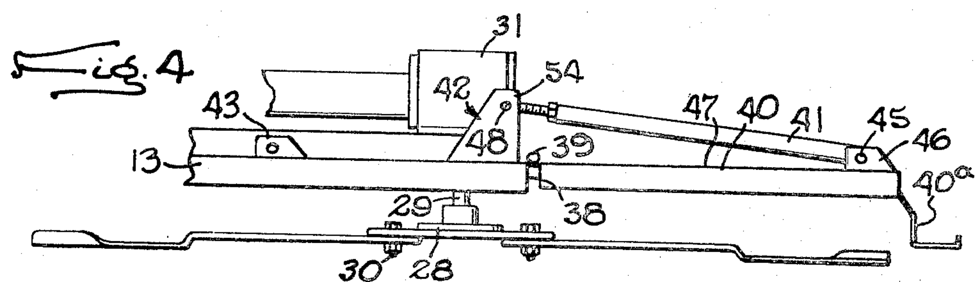
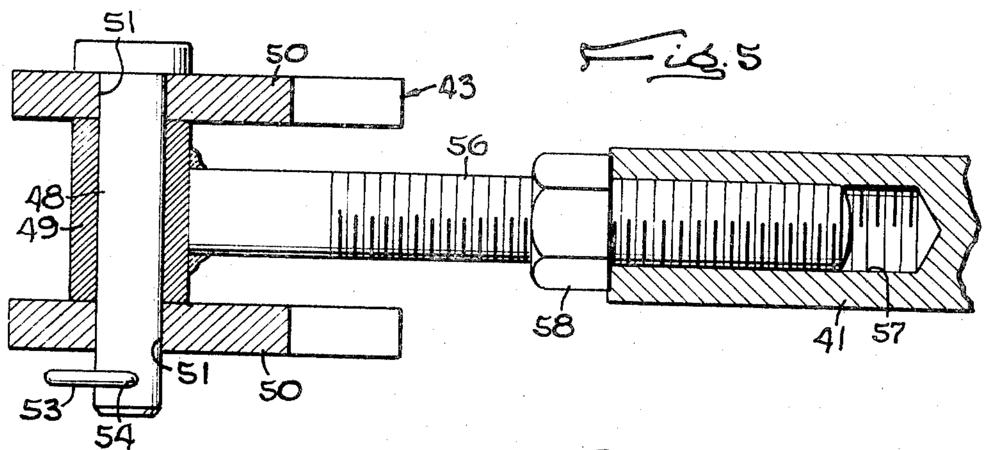
INVENTOR
Henry D. Kasper
by Wolfe, Hubbard, Voit & Osann
ATTORNEYS 3,404,518

GANG MOWER

Henry D. Kasper, Dixon, Ill., assignor to Wood Brothers Manufacturing Company, Oregon, Ill., a corporation of Illinois Filed Oct. 23, 1965, Ser. No. 503,584
8 Claims. (Cl. 56—25.4)

This invention relates to a mower which cuts and shreds material as the mower is pulled along the ground behind a tractor in a generally horizontal position.

Rotary mowers of the type which are pulled along the ground, usually behind a tractor with the blade driven by the power take-off shaft of the tractor, are frequently made much wider than the tractor for increasing the width of the cutting path through the grass. Where the mower is substantially wider than the tractor, it is desirable that some provision be made for transporting the mower along the roads and highways.

Accordingly, the general object of this invention is to provide a mower which cuts a wide path and which can be made sufficiently narrow easily and quickly for transportation along roads and through narrow places.

A further object of this invention is to provide a durable and easily manipulated support arrangement for a mower which permits the wings to be easily and quickly locked in either the vertical or horizontal position and which thereafter holds them rigidly in either of the positions selected.

Other objects and advantages of the invention will become apparent from the following detailed description taken in connection with the accompanying drawings, in which, FIGURE 1 is a perspective view of a mower employing the subject invention, FIG. 2 is an enlarged fragmentary view of one side of the mower showing a wing pivoted to the vertical position, FIG. 3 is a side plan view showing both wings pivoted to the vertical position, FIG. 4 is an enlarged fragmentary side plan view of one wing support arrangement with the wing moved to the horizontal position, FIG. 5 is an enlarged fragmentary view of the means for attaching the wing support to the mower housing and also showing the means for adjusting the length of the wing support bar.

In the drawings, the invention is illustrated as embodied in a mower 10 which preferably is attached to a tractor 11 (FIG. 1) having a power take-off shaft 11*a* for driving the cutting blades 12 (FIG. 3) of the mower.

The mower includes a center housing 13 having a top wall 14 supported in the generally horizontal position between a tongue 15 extending from the front edge thereof and attached ot a hitch 16 on the tractor, and a pair of wheels 17 journaled on extending arms 18 attached to a crossbar 19 at the back edge 20 of the housing. The arms 18 extend forward past the point of attachment to the crossbar 19 and are bolted to flanges 21 fixed to the back edge 20 of the housing. A hydraulic cylinder 23 is fixed between a bracket 24 on the top wall of the housing and an upstanding post 25 on the crossbar 19. By supplying hydraulic fluid to this cylinder through a hose 26 leading to the hydraulic power take-off of the tractor (not shown), the angular position of the crossbar 19 about the flanges 21 can be adjusted to thereby position the wheels 17 relative to the housing for varying the cutting height of the mower.

Frequently, a connection (not shown) is included between the crossbar 19 and the front of the housing where it attaches to the tongue 15 for varying the height of the front edge of the housing simultaneously with varying that of the back edge to maintain the housing level with respect to the ground. A crank 27 may be adjusted to set the maximum angle the crossbar 19 may be turned to, for adjusting the minimum cutting height of the mower in a manner well known and not shown.

The elongated cutting blades 12 are fixed to a hub 28 on the vertically extending shaft 29 journaled in the housing top wall, to rotate in a horizontal plane parallel to the top wall when driven and cut grass or other material through which the mower is pulled. The blades are held on the hub by bolts 30 and may pivot thereabout if necessary, such as when they strike an immovable object like a rock. During normal operation the blades are held in the normal straight-out position by centrifugal force resulting from rotation of the hub.

For driving the shafts 29, a pair of outboard gearboxes 31 are connected thereto and in turn connected to a main gearbox 32 by a shaft (not shown but positioned within the tubular housing 33) extending between the gearboxes. Extending from this main gearbox 32 is a main drive shaft 34 which is releasably connected to the power take-off shaft 12 on the tractor. A guard 35 extends the length of the drive shaft 34, held between brackets 36 and 37 fixed to the housing 13 and tongue 15 respectively. The cutting blades attached to the adjacent hubs 28 are long enough to overlap so no strip of grass is left uncut therebetween, with the rotation of the blades being phased through the rigidly coupled gearboxes so as not to hit when being driven.

In accordance with one feature of the invention, the cutting blades are supported for rotation about axes adjacent the edge of the housing such that they sweep through a path extending past the housing edge, and outer wings, hinged to the housing edge, extend out over and protect the blades as they are rotated. These wings may be lifted easily to a vertical position to make the mower sufficiently narrow for pulling along the road. Since the blades pivot about the bolts 30, they can be swung beneath the housing 13 while the mower is being transported with the wings lifted. Accordingly, as shown in FIGS. 3 and 4, the gearboxes 31 are positioned near the side edge 38 of the center housing 13 with the blades extending out past this side edge to cut a path through the grass much wider than the tractor. To fully protect the blades, outer wings 40 are supported on hinges 39 attached to this side edge 38 of the housing, so the wings may be pivoted between a horizontal position shown in FIG. 4, to a vertical position shown in FIG. 3. Skirts 40*a* on the outer edge of the wings held prevent objects from being thrown out from under the housing.

The invention is further characterized in the fact that the wings are supported at their outer ends by a pair of rigid bars 41 pivotally attached to the outboard ends of the wings 40 and releasably attached to upstanding brackets 42 fixed to the center housing 13, for holding the wings in the horizontal plane of the center housing. Additional brackets 43 are fixed on the housing 13 at points further away from the wings than the upstanding brackets 42 to which the bars 41 may be attached for holding the wings rigidly when pivoted to the vertical position. By this support arrangement, the wings may be quickly and easily pivoted to and locked in either the vertical or horizontal position.

The rigid bars 41 are pivotally secured to the wings 40 by a pin 45 passing through both the bar and the parallel brackets 46 fixed on the top wall 47 of the wing. For holding the wings in the vertical or travel position shown in FIG. 3, the bars are fastened to brackets 43 fixed to the top wall 47 of the housing 13 by passage of a pin 48 through a collar 49 extending transversely of and attached to the bar (FIG. 5). This bracket 43 comprises a pair of vertical flanges 50 spaced apart sufficiently to receive the collar 49 lengthwise therebetween (FIG. 5). The bracket flanges each include hole 51 which are alined so the pin 49 may be inserted when the center opening 52 of the collar 49 is alined therewith, to fix the bar on the bracket. A key 53 may then be inserted in a hole 54 in the end of the pin to hold the pin in the bracket. After the wings are pivoted to this vertical position, the blades 12 are then pivoted about the bolts 30 on the hub 28 so they do not project past the side edge 38 of the center housing 13.

For cutting grass, the wings are pivoted to the horizontal or cutting position as shown in FIGS. 1 and 4. The same bars 41 are used to hold the wings rigidly in this position. For this purpose the upstanding brackets 42 are attached to the top wall 14 of the housing 13 at points closer to the wings than the brackets 43. Attachment of the bars to the brackets 42 is accomplished in the same manner as with brackets 43 by placing the collar 49 between vertical flanges 54 projecting above the bracket and inserting the pin 48 through holes 55 therein and through the center opening 52 in the collar. The sidewalls 54 of the brackets 42 are extended several inches above the top wall 14 of the housing 13 to increase the angle between the bar 41 and the wings 40 when the wings are horizontally positioned, for a more rigid structure. The collar 49 is fixed to a threaded bolt 56 which in turn is threaded into the well 57 in the end of the bar 41 (FIG. 5). A locknut 58 is tightened down to hold the bolt in the bar well. By this arrangement, the fixed angular position of each wing may be adjusted by turning the bolts 56 to vary the effective length of the bar.

By this wing support arrangement, the wings are rigidly supported in either the cutting or travel positions by the same support bars 41 and may be moved simply and quickly from one position to the other by removal and reinsertion of the pins 48 holding the bars. Additionally, the length of each bar can be adjusted to vary the positioning of the wings when the bars are fastened to the stationary brackets. This adjustment is particularly useful in varying the horizontal cutting position of the wings.

I claim as my invention:

1. A rotary mower adapted to be pulled along the ground in a generally horizontal position behind a tractor having a power take-off shaft, said mower comprising a generally horizontal housing having a top wall, a pair of elongated cutting blades supported for rotation at laterally spaced points beneath said top wall and in a plane generally parallel to the top wall, drive means connecting said blades and the tractor power take-off for driving said blades by the tractor, means supporting said housing a predetermined distance above the ground for the cutting of material passing beneath the housing by the blades as the mower is pulled along the ground, said blades projecting from beneath the adjacent side edge of the housing as they rotate, a wing having a top wall hinged to each side edge of said housing for pivoting between generally vertical and horizontal positions, each said wing top wall covering the adjacent blade as it projects thereunder from beneath the housing, a rigid bar pivotally attached at one end to each wing top wall, said bar including means to adjust the length thereof, an upstanding bracket fixed to said housing top wall adjacent each wing including means for attachment to the free end of the rigid bar when the wing is pivoted to the horizontal position, and a pair of second brackets fixed to said housing top wall each at a point farther away from one wing than said upstanding bracket and including means for attachment to the free end of said rigid bar when the wing is in the vertical position whereby said wings are held rigidly in either the vertical or horizontal position by attachment of the rigid bar to the appropriate bracket and the angular position of the wing at each position can be changed by adjusting the length of the bar.

2. A rotary mower adapted to be pulled along the ground in a generally horizontal position by a tractor having a power take-off shaft, said mower comprising a generally horizontal housing having a top wall, an elongated cutting blade supported for rotation beneath and in a plane generally parallel to said top wall, drive means connecting said blade and tractor power take-off shaft for driving said blade by the tractor, means for supporting said housing at a predetermined height above the ground for the cutting of material passing beneath the housing by the rotating blade as the mower is pulled along the ground, said blade etxending past the side edge of the housing top wall as it rotates, a wing having a top wall attached to said side edge of said housing by a hinge for pivoting between horizontal and vertical positions, said wing top wall covering the blade end as it rotates thereunder, a rigid bar pivotally attached at one end to the top side of said wing top wall adjacent the outboard end thereof, an upstanding bracket fixed to the top side of said housing top wall adjacent said hinge and including means for attachment to the free end of said rigid bar to hold the wing in the horizontal position, and a second bracket fixed to the housing top wall at a point on the opposite side of the upstanding bracket from the hinge and also including means for attachment to the free end of said rigid bar when the wing is pivoted to the generally vertical position whereby the same bar is used to hold the wing rigidly in either of the two positions to which it pivots.

3. A rotary mower adapted to be pulled along the ground in a generally horizontal position by a tractor, said mower comprising a generally horizontal housing having a top wall, an elongated cutting blade supported for rotation beneath the housing top wall and in a plane generally parallel to said top wall, means for supporting said housing at a predetermined height above the ground for cutting of material by the rotating blade as the mower is pulled along the ground, said housing being sufficiently narrow that said blade extends past one edge thereof at it rotates, a wing having a top wall hinged along one side to said edge of the housing for pivoting between generally horizontal and vertical positions, said wing top wall extending from the housing and covering the portion of the blade projecting from beneath the housing, a rigid bar pivotally attached at one end to the wing top wall and at the other end to a first upstanding bracket fixed on the housing, and a second upstanding bracket fixed to said housing at a point further away from the wing than the first upstanding bracket and including means for attachment to the free end of the rigid bar when the wing is pivoted to the vertical position whereby the same bar is used to hold the wing in either the horizontal or vertical position.

4. A mower adapted to be pulled along the ground in a generally horizontal position by a tractor, said mower comprising a generally horizontal housing having a top wall, an elongated cutting blade supported for rotation beneath the housing top wall, means supporting said housing at a predetermined height above the ground for cutting material by the rotating blade as the mower is pulled along the ground, said housing being sufficiently narrow that said blade extends past one endge thereof as it rotates, a wing having a top wall hinged along one edge to said housing edge for pivoting between generally horizontal and vertical positions, said wing top wall extending from the housing and covering the portion of the blade which projects past the housing edge, a rigid bar pivotally attached at one end to the wing top wall, a plurality of brackets fixed on said housing at varying distances from said wing each including means for attachment to the free end of said rigid bar, and said rigid bar including means for adjusting the length threof whereby said wing can be pivoted to a plurality of positions and rigidly held by attachment of the rigid bar to the appropriate bracket with the angular position of the wing in each position being adjustable by varying the length of the bar.

5. A mower adapted to be pulled along the ground in a generally horizontal position by a tractor, said mower comrising a housing having a top wall, a shaft journaled on said housing to rotate about a generally vertical axis, a plurality of cutting blades, means pivotally attaching said blades to said shaft whereby as said shaft rotates said blades will extend outward therefrom and cut material passing beneath the housing as the mower is pulled along the ground, said blades projecting from beneath one edge of the housing as they turn about the shaft, a wing pivotally attached to said housing to swing between generally horizontal and vertical positions, said wing when in the horizontal position covering the blades extending thereunder past the edge of said housing, a rigid bar pivotally attached at one end to the wing, and a plurality of brackets fixed on said housing at varying distances from said wing each including means for attaching to the free end of the rigid bar whereby said wing can be pivoted to a horizontal pisition for cutting and pivoted to a vertical position and said blades pivoted back under the housing to lessen the size of said mower, with the rigid bar holding the wing in either position.

6. A mower adapted to be pulled along the ground in a generally horizontal position by a tractor, said mower comprising a generally horizontal housing having a top wall, an elongated cutting blade supported for rotation beneath the housing top wall, means supporting said housing at a predetermined height above the ground for cutting material by the rotating blade as the mower is pulled along the ground, said housing being sufficiently narrow that said blade extends past one edge thereof as it rotates, a wing having a top wall hinged along one edge to said housing edge for pivoting between generally horizontal and vertical positions, said wing top wall extending from the housing and covering the portion of the blade which projects past the housing edge, a rigid bar pivotally attached at one end to the wing top wall, and a plurality of brackets fixed on said housing at varying distances from said wing, each including means for attaching to the free end of said rigid bar whereby said wing can be pivoted to a plurality of positions and rigidly held thereat by attachment of the rigid bar to the appropriate bracket.

7. A rotary mower adapted to be pulled along the ground in a generally horizontal position by a tractor, said mower comprising a generally horizontal housing having a top wall, a pair of elongated cutting blades individually supported at spaced points along opposite edges of said housing for rotation beneath the housing top wall, means supporting said housing at a predetermined height above the ground for cutting material by the rotating blades as the mower is pulled along the ground, said blades being sufficiently long to extend out from beneath the housing past the adjacent housing edge as they are rotated, and a wing hinged to each adjacent edge of the housing for pivoting between a horizontally and vertical position and having a top wall extending a sufficient distance from said housing edge to cover the blade extending out therefrom when the wing is in the horizontal position whereby said wings can be pivoted to a vertical position about the hinge for transporting the mower.

8. A rotary mower adapted to be pulled along the ground in a generally horizontal position by a tractor, said mower comprising a generally horizontal housing having a top wall, a pair of gearboxes mounted at spaced points on said housing and adjacent opposite edges of said top wall, a cutting blade supported by each gearbox for rotation beneath the housing and in a plane parallel to said top wall, means for driving said gearboxes to rotate said blades, said blades being sufficiently long to extend out from beneath said housing past the adjacent top wall edge as they are rotated, and a wing hinged to each adjacent edge of said top wall for pivoting between a horizontal position and a vertical position about said hinge, each wing having a top wall extending a sufficient distance from the adjacent housing edge to cover the blade extending out therefrom when the wing is in the horizontal position whereby said wings can be pivoted to a vertical position about the hinge to make the mower narrow for transporting.

References Cited

UNITED STATES PATENTS

| | | | |
|---|---|---|---|
| 1,693,475 | 11/1928 | Clapper | 56—7 |
| 2,877,618 | 3/1959 | Thornton-Trump | 56—25.4 |
| 2,952,961 | 9/1960 | Engler | 56—25.4 |
| 3,115,738 | 12/1963 | Engler | 56—6 |
| 3,267,652 | 8/1966 | Dahlgren et al. | 56—6 |

ROBERT E. BAGWILL, *Primary Examiner.*